United States Patent

[11] 3,634,758

[72] Inventor Robert F. Flagg
Castro Valley, Calif.
[21] Appl. No. 861,744
[22] Filed Sept. 29, 1969
[45] Patented Jan. 11, 1972
[73] Assignee KDI Holex Incorporated
Cincinnati, Ohio

[54] MEASURING THE FUNCTIONING TIME OF A SEMICONDUCTOR ELECTROEXPLOSIVE INITIATOR
6 Claims, 3 Drawing Figs.

[52] U.S. Cl. .................................................. 324/65 R,
73/167, 307/301, 317/149
[51] Int. Cl. ............................................... G01r 27/02

[50] Field of Search ............................................. 324/28, 62,
65; 73/5, 167; 307/301; 317/149; 102/70.2

[56] References Cited
UNITED STATES PATENTS
3,333,155   7/1967   Steen ........................... 307/301 X

*Primary Examiner*—Edward E. Kubasiewicz
*Attorney*—Owen, Wickersham & Erickson

ABSTRACT: The functioning time of a semiconductor electroexplosive initiator is determined by applying to the initiator a voltage capable of firing it and measuring the time it takes for the initiator to reach a predetermined value bearing a known relation to the functioning time. The voltage is then terminated before the initiator fires.

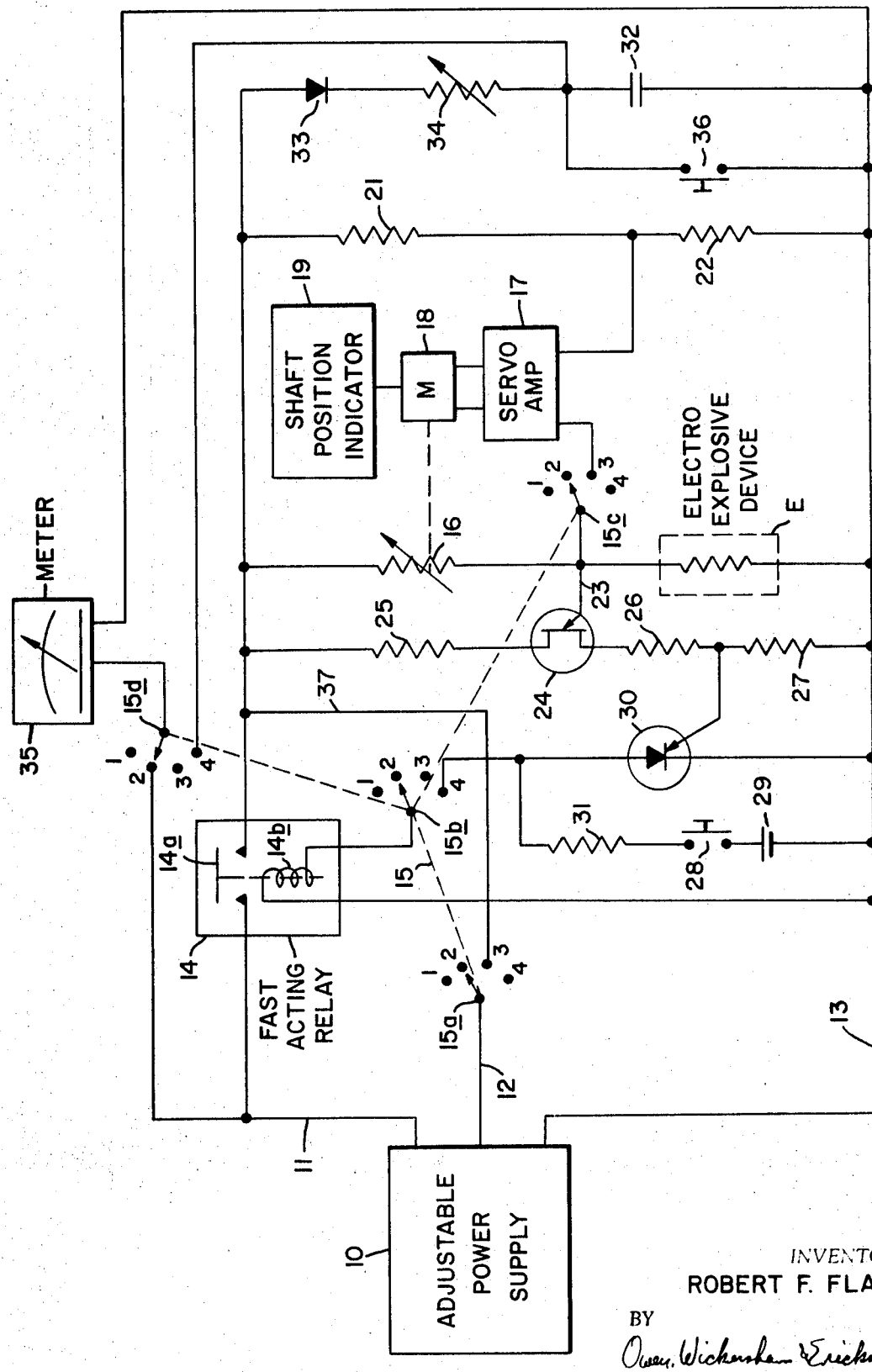
FIG_1
INVENTOR.
ROBERT F. FLAGG

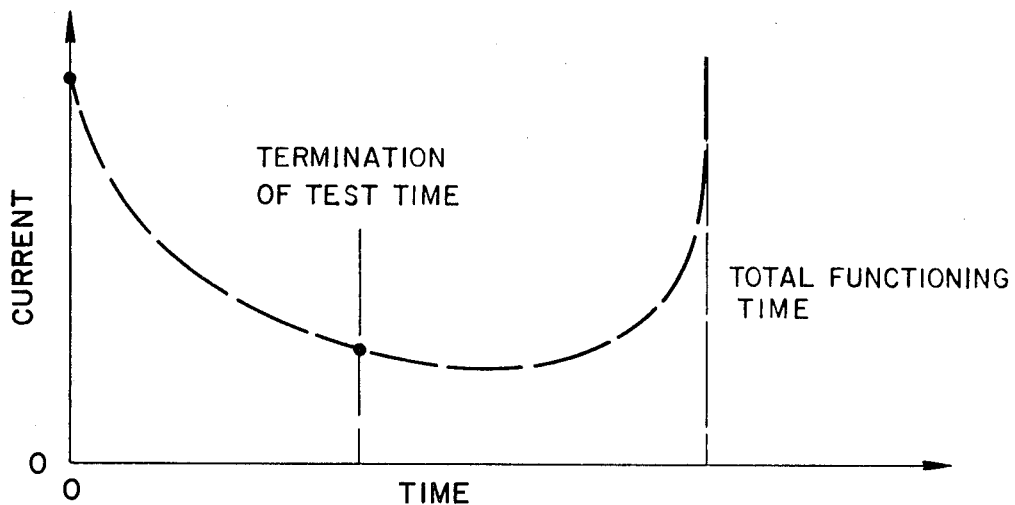
FIG_2
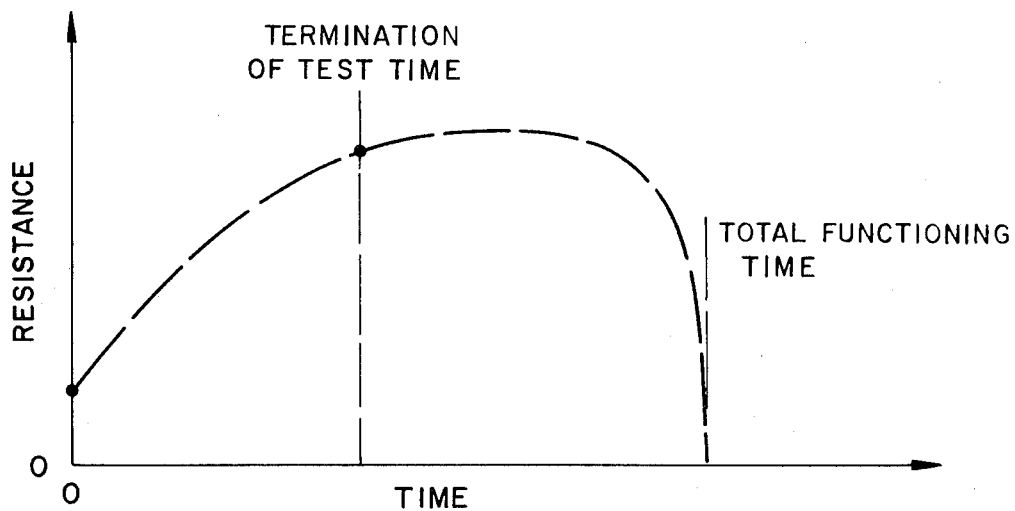
FIG_3

MEASURING THE FUNCTIONING TIME OF A SEMICONDUCTOR ELECTROEXPLOSIVE INITIATOR

The present invention relates to an instrument for measuring in a nondestructive manner the functioning time of a semiconductor electroexplosive initiator.

It has generally not been possible heretofore to test the firing parameters of a particular electroexplosive device without destroying the device under test. Consequently, sampling and statistical analysis have had to be relied upon in predicting the initiation parameters of an unfired part.

A new type of electroexplosive initiator which uses a semiconductor as the initiating element was disclosed in U.S. Pat. No. 3,366,055, and that patent also discloses that the firing threshold voltage of that initiator can be determined nondestructively. However, the method given in that patent for measuring the firing threshold voltage involved a procedure which was generally limited to the laboratory environment by its complexity. More recently, U.S. Pat. application Ser. No. 850,766, filed Aug. 18, 1969, discloses details of an instrument which can measure this voltage directly, and is of such size and simplicity that field operation is possible.

The present invention covers an instrument which is complementary to that of U.S. Pat. application Ser. No. 850,766, filed Aug. 18, 1969, in that it measures the functioning time and does so nondestructively. For this measurement, the semiconductor electroexplosive device under test requires only the connection to the functioning time instrument of this invention and the operation in sequence of a series of switches. The functioning time—which is the time interval beginning with the application of the firing voltage to the electroexplosive device and ending with the instant that the explosive initiates—is read directly from a meter.

A further feature of the present invention is that the current drain of the circuit is small, so that the device can be made portable with battery operation.

Another feature of this instrument is its use of rheostats to vary the calibration of the meter to enter correction factors to account for different semiconductor materials, different ambient temperatures, and different ratios between the firing voltage and the "turnover" or threshold voltage.

Other objects, features and advantages of the present invention will become apparent in the succeeding description and discussion.

In the drawings:

FIG. 1 is an electrical circuit diagram or schematic of an instrument embodying the principles of the present invention.

FIGS. 2 and 3 are related graphs of typical current-time and resistance-time histories of a semiconductor electroexplosive device being fired.

Referring now in detail to the drawings and, in particular, to FIG. 1, the invention preferably utilizes a power supply 10, which may be a transformer-rectifier type for use where common line voltage is available, as in a laboratory, or a battery supply, as for field or portable use. The output of the power supply 10 may have an adjustable voltage tap 11, a fixed low voltage tap 12, and a return or "ground" line 13. A fast-acting relay 14 connects the adjustable voltage tap 11 to the circuit, when actuated. The relay 14 must be capable of closing or opening cleanly and sharply when the control circuit is energized, and in a time short compared to the total time during which the circuit is energized. Presently available "solid-state" relays have the necessary properties. The relay 14 is here shown with a switch 14a and a coil 14b.

The low-voltage fixed output 12 of the power supply 10 is also connected to the circuit through a segment 15a of a four position gang switch 15. The gang switch 15 has four segments, 15a, 15b, 15c, and 15d, and on each the four positions are marked as 1, 2, 3, and 4. The relay coil 14b is connected to the segment 15b.

A semiconductor electroexplosive device E is connected as part of a voltage divider composed of itself and an adjustable rheostat 16. This rheostat 16 may be manually adjustable or may be controlled by a servoamplifier 17, which drives a motor and gearbox 18 which is turn operates the rheostat and a shaft position indicator 19. The other side of the servo input is connected to a voltage divider composed of two equal fixed value resistors 21 and 22. These resistors 21 and 22, and the adjustable rheostat 16 and the device E under test comprise a Wheatstone bridge; in balancing the bridge the resistance of the adjustable rheostat 16 is made equal to the resistance of the electroexplosive device E.

A common connection 23 between the electroexplosive device 15 and the rheostat 16 is also applied to the emitter of a unijunction transistor 24, and controls the firing of the unijunction transistor 24 if a certain voltage is exceeded. The absolute level is determined by the properties of the unijunction transistor 24, a rheostat 25 and resistors 26 and 27 in an arm of the circuit. The common connection 23 is also applied to the segment 15c of the switch 15.

The fast-acting relay 13 is controlled by manually or otherwise closing a switch 28, to apply the voltage of a battery 29 to the control circuit of the fast-acting relay. When certain conditions in the circuit are satisfied, a silicon-controlled rectifier 30 fires, shorting this voltage source and opening the fast-acting relay. The SCR 30 is connected between the return line 13 and terminal 4 of the switch segment 15b; so is the series of the battery 29, the switch 28, and a resistor 31.

During the time the fast-acting relay 14 is closed, a capacitor 32 is also being charged through diode 33 and a calibration rheostat 34. The diode 33 which has a high reverse impedance effectively isolates the capacitor 32 when the fast-acting relay 14 is open and prevents the charge from leaking back through the circuit.

A meter 35 which reads the voltage across the capacitor 32 in step 4 is calibrated to read out in time directly. A reset switch 36 is placed across the capacitor 32 to discharge the capacitor 32 and insure zero voltage, prior to each test.

Other measuring circuits, such as timers controlled by start signals from the fast-acting relay, and stop signals from the unijunction transistor, are possible. However they read out real time and require calibration curves to convert to firing time.

The operation of the instrument requires an appreciation of the dynamic behavior of the current or resistance history during firing. A typical plot of the current-time and resistance-time history of a semiconductor initiator E being fired is given in FIGS. 2 and 3. The current first decreased from its initial value as the resistance increases, due to its increasing temperature. The current then reaches a minimum as the resistance reaches a maximum. The current then begins to increase with ever increasing rapidity as the resistance begins to decrease in the intrinsic conduction region. Finally a "thermal runaway" situation exists and the device continuously heats and finally destroys itself, and in the process initiates the explosive in contact with it.

While the absolute values of current and time will vary from unit to unit, the shape of the curves is identical from unit to unit, i.e., the histories are self-similar, for a given ration of firing voltage to threshold voltage. Hence, the time it takes a device E to reach a certain point in its firing trajectory is a fixed fraction of its total functioning time. By measuring the time it takes to reach a predetermined point in the trajectory, the total functioning time is known.

The purpose of the fast-acting relay 14, which terminates the firing process after the predetermined point is reached and the time determined, is to start the firing process and to terminate it after a certain point. If, for any reason the relay 14 should fail to open, the part would continue on its trajectory and would ultimately fire, a result which is not desired.

Basically, the functioning time instrument applies a voltage capable of firing an electroexplosive device to a part E. It monitors the behavior of the part E and when it reaches a certain resistance, it abruptly terminates the firing process and measures the length of time to reach that point. Meter calibration introduced in the meter calibration circuit through rheostats account for the difference in time to reach a given point to the total firing time and also permit the introduction of correction factors for different materials and for different ratios of turnover voltage to firing voltage.

In operation the components function as follows:

With the main selector switch 15 in position 1 the entire instrument is disabled. When the operator moves the main selector 15 to position 2, the power supply is actuated and the meter 35 is switched by the segment 15d to read the power supply voltage. As initially only one-half of the power supply voltage will appear across the part E under test, the read out is preferably calibrated to read out only one-half of the power supply voltage.

With the main selector switch 15 in position 3, a small voltage is applied to the circuit by a line 37 around the open relay 14. This voltage is small enough to do no significant heating of the device under test. The servoamplifier 17, which is then connected into the bridge composed of two fixed resistors 21 and 22, the device E under test and the rheostat 16, detects any unbalance and adjusts the rheostat 16 until it is equal in resistance to the device E under test. The shaft position indicator 19 reads out resistance mechanically. It is also possible to read out resistance electronically; for example, by passing a controlled amount of current through one arm of the bridge and measuring the voltage across either the rheostat 16 or the part E and calibrating the meter circuit to read the resistance directly.

With the main selector switch 15 in position 4, the circuit is ready to determine functioning time. The switch 36 across the capacitor 32 is closed momentarily to insure that there is no residual charge on the capacitor 32.

Closing the firing switch 28 at position 4 applies voltage to the control circuit of the fast-acting relay, which in turn closes, applying voltage to the bridge circuit containing 16, 21, 22 and E and commences charging the capacitor 32 through the diode 33 and rheostat 34. As the current heats the initiating element of the electroexplosive device E, it increases in resistance. The voltage at 23 increases from one-half the voltage applied to the circuit. When it reaches a preset level, as for example, 0.715 of the applied voltage when the hot resistance is 2.5 times its cold resistance, the unijunction transistor 24 is triggered. The increase in current through this transistor 24 is sufficient to trigger the SCR 30. This in turn shorts the control circuit of the fast-acting relay 14 and opens the circuit, terminating the firing of the electroexplosive device E, and stopping the charging of the capacitor 32. The high reverse resistance of the diode 33 prevents the charge on the capacitor 32 from discharging through the circuit.

The voltage which appears on the very high impedance voltmeter 35 is nearly linearly related to the time, provided the testing time is a small fraction of the time given by the product of the capacitance of 32 and the resistance of 34. The meter 35, in order to present a high impedance to current flow while measuring the capacitor voltage, will in most cases be a digital-type meter or have high-input impedance-matching devices, such as electrometer amplifiers.

A number of variations on this basic theme are possible. For example, the motor drive and servo can be omitted and a galvanometer used in conjunction with manual balancing. Relays can be used instead of switches.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for nondestructively determining the functioning time of a semiconductor electroexplosive initiator, comprising the steps of
   applying to said initiator a known voltage capable of firing said initiator,
   responding to the resistance of said initiator reaching a predetermined value bearing a known relation to said functioning time as a result of being heated by the applied said voltage,
   terminating said voltage after said resistance reaches said predetermined value and before said initiator arrives at its firing condition, and
   measuring the elapsed time between the point of applying voltage to the point of terminating.

2. A method for nondestructively determining the functioning time of a semiconductor electroexplosive initiator, comprising the steps of
   applying to said initiator a predetermined voltage capable of firing said initiator, thereby causing the resistance of said initiator to increase toward a maximum value, after which time the resistance of said initiator tends to decrease,
   responding to the resistance of said initiator reaching a predetermined value slightly lower than said maximum value and bearing a known relation to said functioning time,
   terminating said voltage immediately after said resistance reaches said predetermined value so that said initiator is kept from arriving at its firing condition, and
   measuring the time between the point of applying the voltage to the time of terminating said voltage.

3. Apparatus for nondestructively determining the functioning time of a semiconductor electroexplosive initiator, including in combination:
   means for applying to said initiator a voltage capable of firing said initiator,
   means connected to said initiator responsive to the resistance of said initiator reaching a predetermined value bearing a known relation to said functioning time as a result of being heated by the applied voltage,
   means for automatically terminating said voltage after said resistance reaches said predetermined value and before said initiator arrives at its firing condition, and
   means for measuring the elapsed time from the moment of applying the voltage to the moment of terminating said voltage.

4. An instrument for nondestructively determining the functioning time of a semiconductor electroexplosive initiator, including in combination:
   a power supply, having an output and a return,
   a fast-acting relay having an actuation circuit and a controlled normally open switch having an input contact connected to said power supply output and an output line,
   said initiator and an adjustable rheostat being connected in series between said output line and said return,
   two fixed-value resistors in series between said output line and said return,
   rheostat-adjusting means for driving said rheostat toward a value equal to that of said initiator, said rheostat adjustment means being connected between said fixed-value resistors and having a second connection,
   a high-impedance voltmeter connected to said return line,
   a diode and a capacitor in series between said output line and said return,
   deactuating means connected across said output line and said return line responsive to said initiator reaching a predetermined resistance for deactuating said control of said relay and thereby opening its switch,
   a gang switch having four segments each with successive positions (1), (2), (3) and (4), comprising
   a first segment having an input open in all except position (2) and then connected to the power supply output, and an output connected to said voltmeter,
   a second segment with an input connected to the output of said power supply and its output open except in position (3) when it is connected to said output line,
   a third segment having an input connection between said initiator and said rheostat and an output open in all except position 3 and connected in position (3) to said servoamplifier, and
   a fourth segment having an output connected to the coil of said fast-action relay and an input open in all positions except position (4) and in position (4) connected to said deactuation means.

5. An instrument for nondestructively determining functioning time of a semiconductor electroexplosive initiator, including in combination
- a power supply, having an output and a return,
- a fast-acting relay having an actuation circuit and a controlled normally open switch having an input contact connected to said power supply output and an output line,
- said initiator and an adjustable rheostat being connected in series between said output line and said return,
- two fixed-value resistors in series between said output line and said return, in parallel with said initiator and rheostat,
- a servoamplifier connected between said fixed-value resistors and having a second connection,
- a motor driven by said servoamplifier and driving said rheostat toward a value equal to that of said initiator,
- a shaft position indicator for said motor,
- a high-impedance voltmeter connected to said return line,
- a diode and a capacitor in series between said output line and said return,
- a unijunction transistor, in series with resistance means between said output line and said return and connected between said initiator and said rheostat,
- a silicon-controlled rectifier having a gate connected to said unijunction transistor through said resistance means, an input connected to said return line, and an output,
- a gang switch having four segments each with four positions, comprising
- a first segment with an input connected to the output of said power supply and an output open except in position three, when it is connected to said output line,
- a second segment having an output connected to the control of said fast-action relay and an input open in the first three positions and in its position four connected to the output of said silicon-controlled rectifier,
- a third segment having an input connection between said initiator and said rheostat and an output open in all except position three and connected in position three to said servoamplifier, and
- a fourth segment having an input open in all except position two and then connected to the power supply output, and position (4) and then connected to the measuring capacitor and an output connected to said voltmeter.

6. Apparatus for nondestructively determining the functioning time of a semiconductor electroexplosive initiator, including in combination:
- means for applying to said initiator a predetermined voltage capable of firing said initiator, thereby causing the resistance of said initiator to increase toward a maximum value, after which time the resistance of said initiator tends to decrease,
- means connected to said initiator responsive to the resistance of said initiator reaching a predetermined value slightly lower than said maximum value and bearing a known relation to said functioning time,
- terminating said voltage immediately after said resistance reaches said predetermined value so that said initiator is kept from arriving at its firing condition, and
- measuring the time between the point of applying the voltage to the point of terminating the voltage.

* * * * *